United States Patent
Bertolli et al.

(10) Patent No.: US 9,513,832 B2
(45) Date of Patent: Dec. 6, 2016

(54) ACCESSING GLOBAL DATA FROM ACCELERATOR DEVICES

(71) Applicant: International Business Machines Corporation, Armonk, NY (US)

(72) Inventors: Carlo Bertolli, Dobbs Ferry, NY (US); John K. O'Brien, South Salem, NY (US); Olivier H. Sallenave, Baldwin Place, NY (US); Zehra N. Sura, Yorktown Heights, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 41 days.

(21) Appl. No.: 14/667,760

(22) Filed: Mar. 25, 2015

(65) Prior Publication Data

US 2016/0283158 A1  Sep. 29, 2016

(51) Int. Cl.
*G06F 3/06* (2006.01)

(52) U.S. Cl.
CPC ........... *G06F 3/0631* (2013.01); *G06F 3/0604* (2013.01); *G06F 3/0673* (2013.01)

(58) Field of Classification Search
None
See application file for complete search history.

(56) References Cited

U.S. PATENT DOCUMENTS

| 5,774,722 A * | 6/1998 | Gheith | G06F 9/44521 |
| | | | 719/331 |
| 7,310,799 B2 * | 12/2007 | Eisenberg | G06F 8/445 |
| | | | 717/154 |
| 8,145,879 B2 | 3/2012 | Vishkin | |
| 8,799,884 B2 | 8/2014 | Dreyer et al. | |

FOREIGN PATENT DOCUMENTS

WO  2011092323 A1  8/2011

OTHER PUBLICATIONS

Zurich. "CUDA". GP-GPU: General Purpose Programming on the Graphics Processing Unit. Spring 2011. <https://www.cvg.ethz.ch/teaching/2011spring/gpgpu/Spring2011Course.php>.*

(Continued)

*Primary Examiner* — Charles Rones
*Assistant Examiner* — Hewy Li
(74) *Attorney, Agent, or Firm* — Cantor Colburn LLP (57) ABSTRACT

An aspect includes a table of contents (TOC) that was generated by a compiler being received at an accelerator device. The TOC includes an address of global data in a host memory space. The global data is copied from the address in the host memory space to an address in the device memory space. The address in the host memory space is obtained from the received TOC. The received TOC is updated to indicate that global data is stored at the address in the device memory space. A kernel that accesses the global data from the address in the device memory space is executed. The address in the device memory space is obtained based on contents of the updated TOC. When the executing is completed, the global data from the address in the device memory space is copied to the address in the host memory space.

12 Claims, 7 Drawing Sheets

(56) References Cited

OTHER PUBLICATIONS

Bendersky, Eli. "Position Independent Code (PIC) in shared libraries." Published Nov. 3, 2011. <http://eli.thegreenplace.net/2011/11/03/position-independent-code-pic-in-shared-libraries/>.*

Traxnet. "Understanding Modern GPUs". Published Jul. 16, 2011. <https://traxnet.wordpress.com/2011/07/16/understandingmoderngpus1/>.*

Zurich. "CUDA Memory". GP-GPU: General Purpose Programming on the Graphics Processing Unit. Spring 2011. <https://www.cvg.ethz.ch/teaching/2011spring/gpgpu/Spring2011Course.php>.*

Bendersky, Eli. "Load-time relocation of shared libraries". Published Aug. 25, 2011. <http://eli.thegreenplace.net/2011/08/25/loadtimerelocationofsharedlibraries/>.*

Haber et al., "Optimization opportunities created by global data reordering," Proceedings of the international symposium on Code generation and optimization: feedback-directed and runtime optimization, IEEE Computer Society, 2003, 10 pages.

Harris, "Unified Memory in CUDA 6," http://devblogs.nvidia.com/parallelforall/unified-memory-in-cuda-6/ Nov. 18, 2013, 8 pages.

McIlroy, "Using Program Behaviour to Exploit Heterogeneous Multi-Core Processors," Diss. University of Glasgow, 2010, 246 pages.

Reyes et al., "accULL: An OpenACC Implementation with CUDA and OpenCL Support," C. Kaklamanis et al. (Eds.): Euro-Par 2012, LNCS 7484, pp. 871-882, 2012. c Springer-Verlag Berlin Heidelberg 2012, 12 pages.

Reyes et al., "Directive-based Programming for GPUs: A Comparative Study," 2012 IEEE 14th International Conference on High Performance Computing and Communications, 8 pages.

List of Patents or Patent Applications Treated as Related; Appendix P, Filed Jul. 7, 2015, 2 pages.

Carlo Bertolli et al., Pending U.S. Appl. No. 14/745,486 entitled "Accessing Global Data From Accelerator Devices" filed with the U.S. Patent and Trademark Office on Jun. 22, 2015.

\* cited by examiner

ACCESSING GLOBAL DATA FROM ACCELERATOR DEVICES

STATEMENT REGARDING FEDERALLY SPONSORED RESEARCH OR DEVELOPMENT

This invention was made with Government support under B599858 awarded by Department of Energy. The Government has certain rights to this invention.

BACKGROUND

Various embodiments of this disclosure relate to accessing data in a computer system and, more particularly, to accessing global data from accelerator devices.

In recent years there has been a trend towards offloading compute intensive workloads from host processors to specialized devices referred to as accelerators. Accelerators are devices that are optimized to enhance the performance or functionality of a computing system. Accelerators can be used to improve platform performance in key computation (e.g., financial services), visualization (e.g., advanced gaming and workstations), content processing (e.g., Crypto and XML acceleration), and intelligent input/output (I/O) applications.

On accelerator devices such as active memory cubes (AMCs) and graphics processing units (GPUs), data needs to be mapped onto the target device prior to the data being accessed.

SUMMARY

Embodiments include methods, systems, and computer program products for accessing global data from an accelerator device. A table of contents (TOC) that was generated by a compiler is received at an accelerator device. The TOC includes an address of global data in a host memory space. The global data is copied from the address in the host memory space to an address in the device memory space. The address in the host memory space obtained from the received TOC. The received TOC is updated to indicate that that global data is stored at the address in the device memory space. A kernel that accesses the global data from the address in the device memory space is executed. The address in the device memory space is obtained based on contents of the updated TOC. When the executing of the kernel is completed, the global data from the address in the device memory space is copied to the address in the host memory space.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

Various embodiments of this disclosure relate to providing accelerator devices with access to global data. In accordance with an embodiment, a compiler generates one table of contents (TOC) for each accelerator device that will be executing code that accesses the global data. The TOC includes relocations to the global data that are accessed from a code region executing on the accelerator device. That is, an entry for a global variable in a TOC generated by the compiler and stored on an accelerator device includes the location (address) of the global variables in the host memory space. Embodiments allow an accelerator device to access global data without requiring a lookup operation during run-time to determine address of the global variables.

Host processors and accelerator devices can have two different memory spaces. A host processor can have a host memory space and the accelerator device can have a device memory space. As used herein, the term "host memory space" refers to memory that can be addressed directly from code that runs on a host processor. As used herein, the term "device memory space" refers to memory than can be addressed directly from code that runs on an accelerator device. Prior to an accelerator device executing software code (i.e., prior to kernel execution) that requires access to data located in the host memory space, the data needs to be copied from the host memory space into the device memory space. The addresses of global variables in the host memory space are known by the compiler at link-time, while the addresses of global variables copied into the device memory space are not known until run-time.

In contemporary systems a compiler generates a TOC which contains the addresses of global data. Global data accesses are then compiled into accesses through this table, which is filled in at link-time. In an embodiment, where the devices are active memory cubes (AMCs), the compiler generates one TOC per device. Data access is implemented through a lookup operation at run-time, with the code executing at the accelerator device performing a look-up in the TOC to determine an address of each of the global variables that is accessed (e.g., reads, writes, modifies). Performing the lookup in the TOC during run-time can impact the performance of the device.

As used herein, the term "global data" refers to data with global scope, meaning that the data can be referenced from any part of the program. As used herein, the term "local data" refers to data with local scope, meaning that the data can only be referenced from the function or code section in which it is declared. Both global data and local data can be accessed from a host processor or an accelerator device.

As used herein, the term "link-time" refers to the final phase of the compiler toolchain, in which several compilation units are linked into one single binary. During the linking phase, symbols that refer to data declared from a different compilation unit (also known as "relocations") are replaced with the actual address of the data in the linked binary. As used herein, the term "run-time" refers to the phase in which the linked binary runs on a system which comprises host processors and accelerator devices. As used herein, the term "kernel execution" refers to the phase in which a compute intensive workload is executed by a host processor or an accelerator device. Such workload is usually identified as a code region by the programmer or the compiler.

As used herein, the term "code region" refers to a part of the program that has been annotated by the programmer or the compiler, so that it will potentially be executed by an accelerator device at run-time.

In embodiments disclosed herein, the accelerator devices do not perform table lookups to determine addresses of global variables during run-time. In an embodiment, the compiler generates one TOC for each device that will be executing a code region that accesses global data. Such TOC includes references to (e.g., addresses of) global data accessed from the code region when it executes on an accelerator device, and the TOC is copied into every device which potentially accesses the global data. Different devices can have TOCs 114 with different content, as a TOC 114 for an accelerator device can include entries only for those global variables that are accessed by that particular accelerator device. The global variables accessed can vary from device to device depending for example, on the code being executed and other factors. Prior to executing the code region on a target device, the runtime first ensures that the global data itself is mapped to the target device. Then, the runtime can translate the addresses contained within the TOC to point to the copies of the global data in the device memory space. The original contents of the TOC are restored once the code region has been executed and the mapping to the device memory space is no longer needed.

Figure 1:
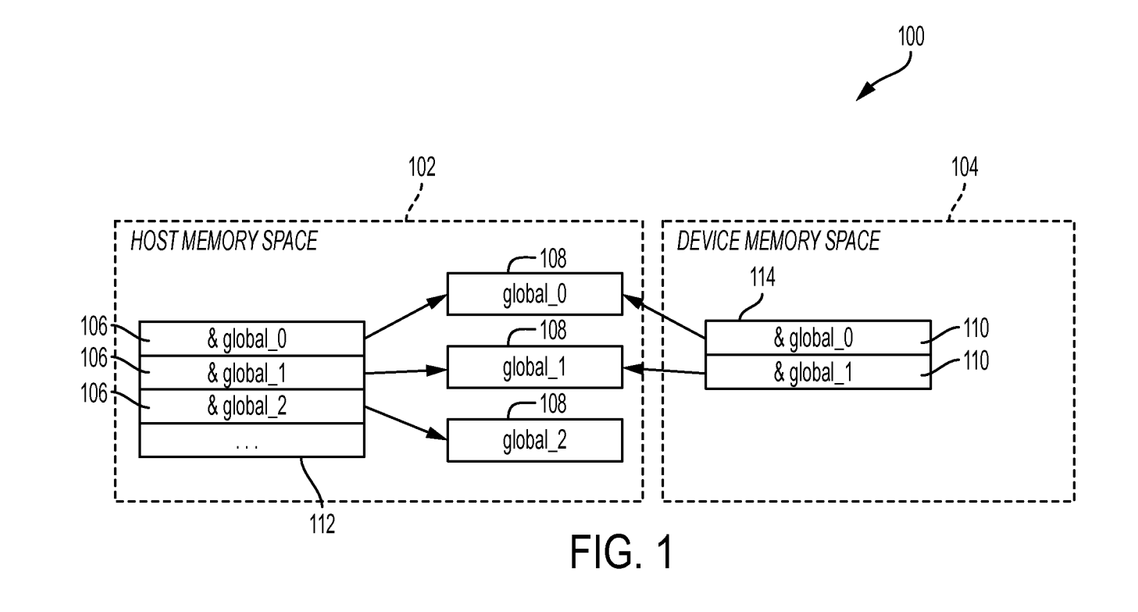
FIG. 1 is a block diagram of a system for accessing global data from an accelerator device in accordance with an embodiment.

Turning now to FIG. 1, a block diagram of a system 100 for accessing global data is generally shown in accordance with an embodiment. FIG. 1 includes a host memory space 102 and a device memory space 104. As shown in FIG. 1, the compiler has generated a host memory space 102 that includes a TOC 112 for keeping track of the addresses 106 (&global_0, &global_1, &global_2) of the memory locations 108 of the global data (e.g., global_0, global_1, global_2). As shown in FIG. 1, the compiler has also generated a TOC 114 stored in the device memory space 104 of an accelerator device. In the embodiment shown in FIG. 1, the accelerator device requires access to the global data represents by global variables global_0 and global_1. The addresses 110 (&global_0, &global_1) in the TOC 114 in the device memory space 104 refer to the addresses of the original data 108 stored in the host memory space 102.

Figure 2:
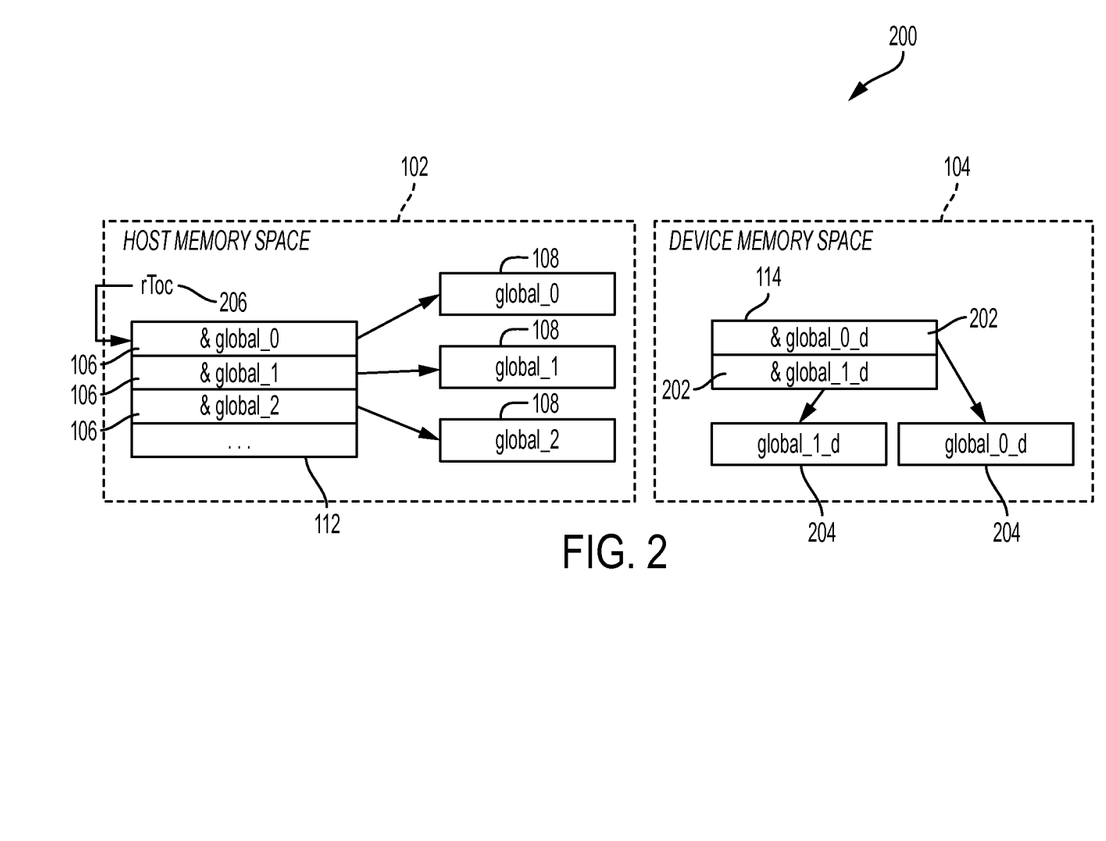
FIG. 2 is a block diagram of a system for accessing global data from an accelerator device in accordance with an embodiment.

Turning now to FIG. 2, a block diagram of a system 200 for accessing global data is generally shown in accordance with an embodiment. As shown in FIG. 2, code is executing on the host processor and the address of the TOC 112 in the host memory, "rToc" 206 is stored in a register. In addition, the runtime on the accelerator device has copied the global data specified in the TOC 114 onto memory locations 204 in the device memory space 104. Also as shown in FIG. 2, the runtime on the accelerator device has updated the TOC 114 to include the addresses 202 (&global_0_d, &global_1_d) of the memory locations 204 in the device memory space 104. The runtime performs the copying of the data and the updating of the TOC 114 shown in FIG. 2 prior to kernel execution on the accelerator device.

Figure 3:
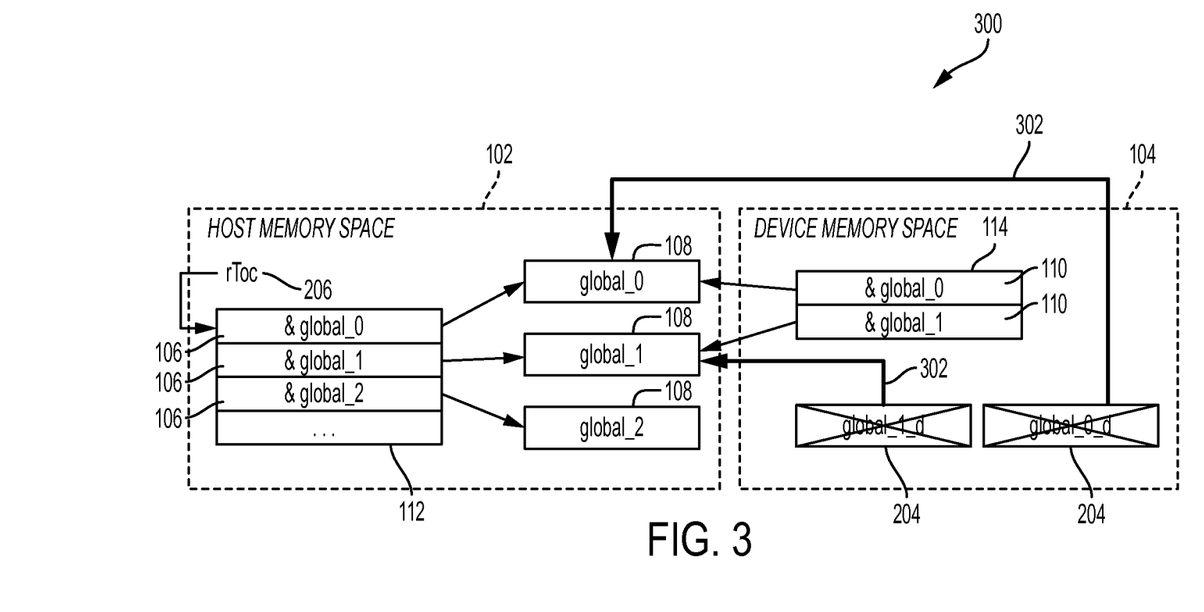
FIG. 3 is a block diagram of a system for accessing global data from an accelerator device in accordance with an embodiment.

Turning now to FIG. 3, a block diagram of a system 300 for accessing global data is generally shown in accordance with an embodiment. As shown in FIG. 3, the kernel (e.g., the code region) is executed by the accelerator device using the TOC 114 in the device memory space 104 to access the copy of the global data located on the device memory space 104. Once the kernel completes execution, the runtime restores the contents of the TOC 114 in the memory space 102 back to the addresses 110 (&global_0, &global_1) of the global data 108 in the host memory space 102. The runtime also synchronizes (copies) 302 the data stored in the memory locations 204 in the device memory space 104 into the corresponding memory locations 108 on the host memory space 102. As shown in FIG. 3, the runtime can also deallocate the copies of the global data stored in memory locations in the memory device space 104.

Figure 4:
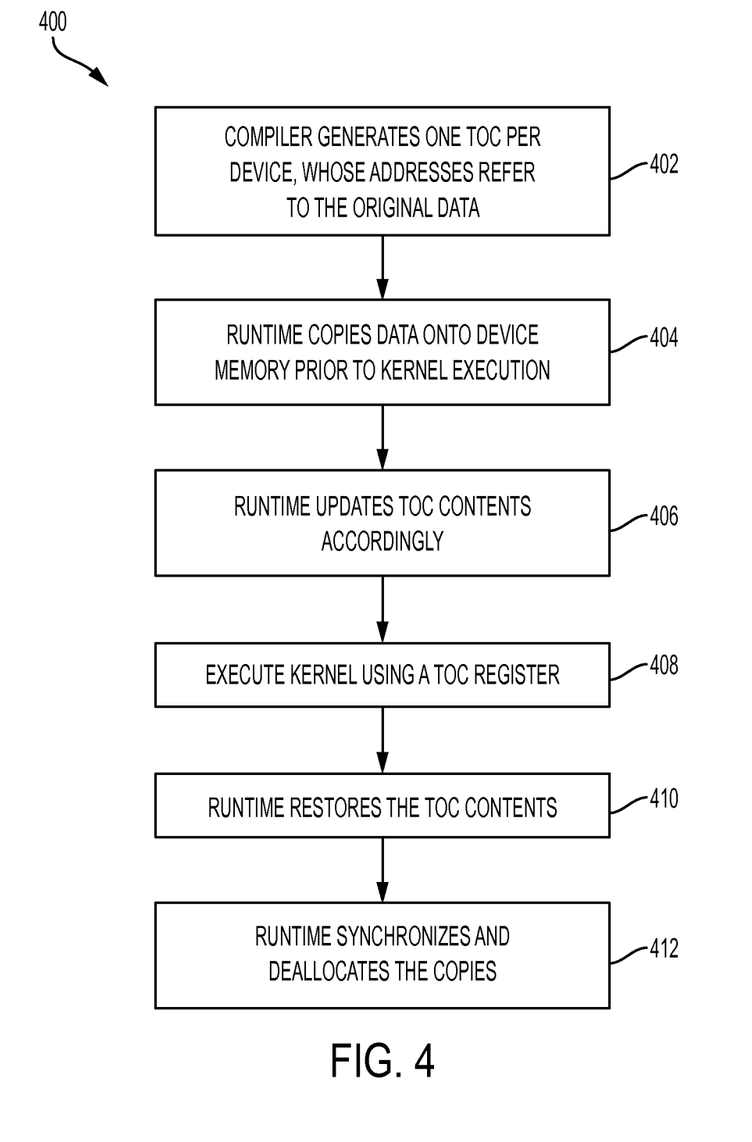
FIG. 4 is a flow diagram of a process for providing accelerator devices with access to global data in accordance with an embodiment.

Turning now to FIG. 4, a process flow 400 for providing accelerator devices with access to global data is generally shown in accordance with an embodiment. At block 402, a compiler can generate one TOC for each device that requires access to global data in the host memory space. At block 402, a runtime can copy the global data, based on the contents of the TOC, onto a memory space of a device prior to kernel execution on the device. At block 404, the runtime can update the TOC on the device based on the locations of the global data on the memory space of the device. At block 408, the kernel can be executed using the TOC register in the memory space of the device. At block 410, the runtime can restore the TOC contents so that they point to the location of the global variables in the host device memory space. At block 412, the runtime can synchronize the global data values by copying the global data from the memory space of the device into the memory space of the host. In addition, the copies of the global data can be deallocated from the memory space of the device.

Figure 5:
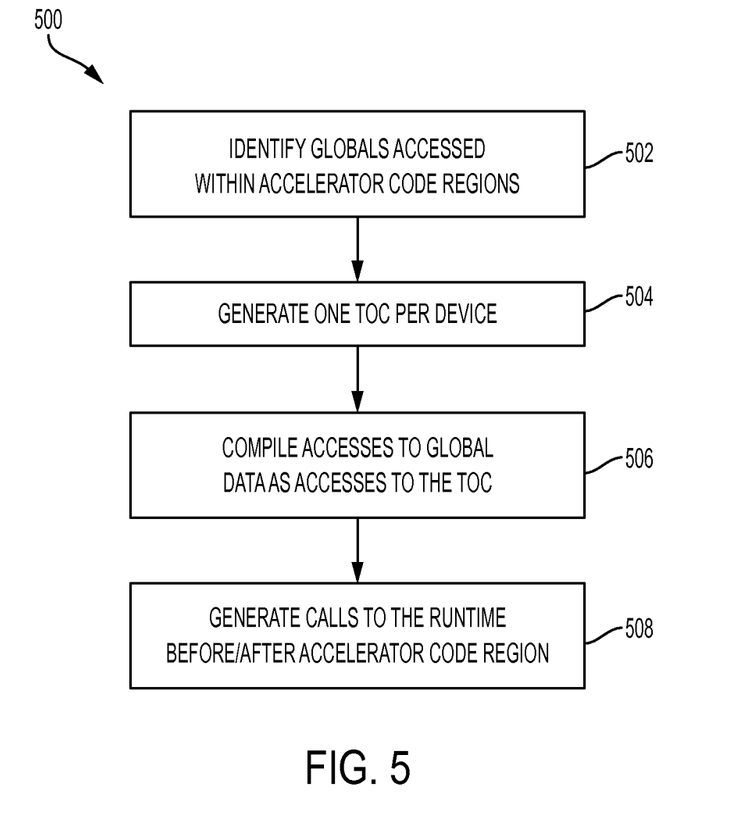
FIG. 5 is a process flow of a compiler for providing accelerator devices with access to global data in accordance with an embodiment.

Turning now to FIG. 5, a process flow 500 of a compiler for generating executable code for providing accelerator devices with access to global data is generally shown in accordance with an embodiment. At block 502, global data accessed within accelerator code regions is identified. At block 504, one TOC per accelerator device is generated. In an embodiment, the TOCs contain reallocations to the global data accessed within the accelerator code regions. At block 506, accesses to global data are compiled as accesses to the TOC. In an embodiment, the offset to the TOC is determined statically. At block 508, calls to the runtime before and after the accelerator code region are generated by the compiler. In an embodiment, the runtime copies the data, updates the TOC contents and sets the TOC register.

In an embodiment, the runtime can allocate and fill a TOC when entering any accelerator code region. The resulting TOC can contain data for all variables (both global and local) accessed within the specific accelerator code region. In this embodiment, the TOC contains local and global variables, the TOC is created during run-time, there is one TOC per code region execution, and the lifetime of the TOC is the lifetime of the code region execution. The runtime can keep track of which TOCs have been translated and maintain one semaphore per TOC to handle the case where more than one lane (e.g., device) is using the same TOC simultaneously. This embodiment is contrasted with embodiments described above where the TOC contains global variables, the TOC is created during link-time, there is one TOC per device, and the TOC is persistent. Combinations of these embodiments can also be implemented.

Figure 6:
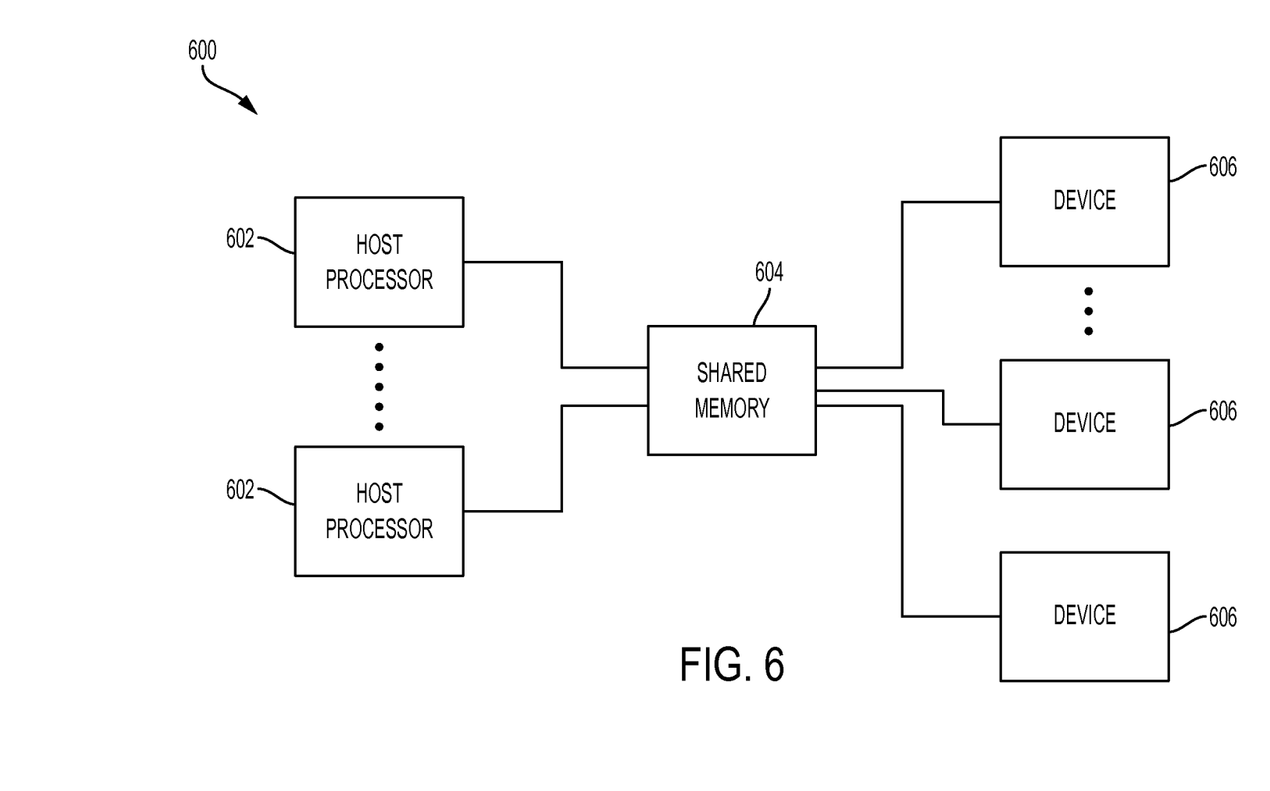
FIG. 6 is a block diagram of a system that includes shared memory in accordance with an embodiment.

Turning now to FIG. 6, a system 600 for providing accelerator devices with access to global data is generally shown in accordance with an embodiment. The embodiment in FIG. 6 includes multiple host processors 602, a shared memory 604, and multiple devices 606 such as accelerators or other hardware devices. Each device 606 may be, for example, an AMC, a GPU, or a field-programmable gate array (FPGA). Each device 606 may include one or more processing elements (PEs), where each PE may be a processor core or a stripped-down version of a processor core with reduced complexity or functionality.

The host processors 602 and the devices 606 may differ in various ways. For example, an operating system may run on a host processor 602, while the devices 606 may run accelerated code. A host processor 602 may behave as a control processor, in that it may allocate resources and manage communications between the devices 606. The host processor 602 may receive programs for execution by the computer system and may manage the one or more devices 606 execute such programs.

In an embodiment, the shared memory 604 shown in FIG. 6 is logically located in the host memory space 102. The shared memory 604 can be physically located in a host processor 602 and/or in a separate memory device. The shared memory 604 can be connected to the host processors 602 via a network (e.g., Internet, wireless, cellular) or it can be directly connected to the host processors 602 (e.g., via a cable). The shared memory 604 can also be stored across multiple physical locations and different portions of the shared memory can be connected differently to the host processors 602. In addition, different host processors 602 can connect to the shared memory 604 in different ways. Similarly, the shared memory 604 can be connected to the devices 606 via a network or a direct connection, with different portions of the shared memory 604 connected differently.

Figure 7:
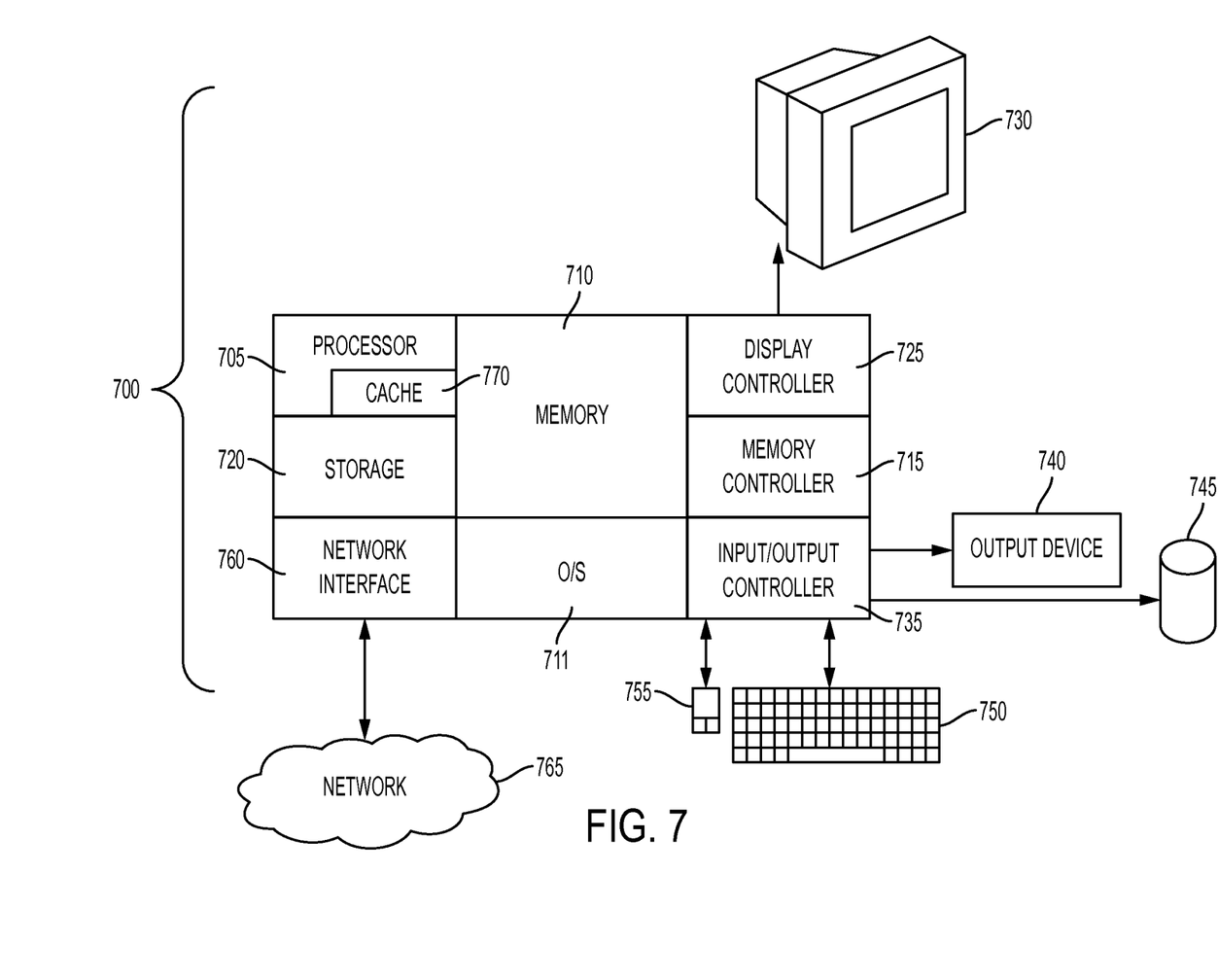
FIG. 7 is a block diagram of a computing device for implementing some or all aspects of the system for accessing global data from an accelerator device in accordance with an embodiment.

Turning now to FIG. 7, a block diagram of a computer system 700 for use in implementing the accessing of global data from accelerator devices is generally shown according to some embodiments. The processing described herein may be implemented in hardware, software (e.g., firmware), or a combination thereof. In an exemplary embodiment, the methods described may be implemented, at least in part, in hardware and may be part of the microprocessor of a special or general-purpose computer system 700, such as a personal computer, workstation, minicomputer, or mainframe computer.

In an exemplary embodiment, as shown in FIG. 7, the computer system 700 includes a processor 705, memory 710 coupled to a memory controller 715, and one or more input devices 745 and/or output devices 740, such as peripherals, that are communicatively coupled via a local I/O controller 735. These devices 740 and 745 may include, for example, a printer, a scanner, a microphone, and the like. A conventional keyboard 750 and mouse 755 may be coupled to the I/O controller 735. The I/O controller 735 may be, for example, one or more buses or other wired or wireless connections, as are known in the art. The I/O controller 735 may have additional elements, which are omitted for simplicity, such as controllers, buffers (caches), drivers, repeaters, and receivers, to enable communications.

The I/O devices 740, 745 may further include devices that communicate both inputs and outputs, for instance disk and tape storage, a network interface card (NIC) or modulator/demodulator (for accessing other files, devices, systems, or a network), a radio frequency (RF) or other transceiver, a telephonic interface, a bridge, a router, and the like.

The processor 705 is a hardware device for executing hardware instructions or software, particularly those stored in memory 710. The processor 705 may be a custom made or commercially available processor, a central processing unit (CPU), an auxiliary processor among several processors associated with the computer system 700, a semiconductor based microprocessor (in the form of a microchip or chip set), a macroprocessor, or other device for executing instructions. The processor 705 includes a cache 770, which may include, but is not limited to, an instruction cache to speed up executable instruction fetch, a data cache to speed up data fetch and store, and a translation lookaside buffer (TLB) used to speed up virtual-to-physical address translation for both executable instructions and data. The cache 770 may be organized as a hierarchy of more cache levels (L1, L2, etc.).

The memory 710 may include one or combinations of volatile memory elements (e.g., random access memory, RAM, such as DRAM, SRAM, SDRAM, etc.) and nonvolatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 710 may incorporate electronic, magnetic, optical, or other types of storage media. Note that the memory 710 may have a distributed architecture, where various components are situated remote from one another but may be accessed by the processor 705.

The instructions in memory 710 may include one or more separate programs, each of which comprises an ordered listing of executable instructions for implementing logical functions. In the example of FIG. 7, the instructions in the memory 710 include a suitable operating system (OS) 711. The operating system 711 essentially may control the execution of other computer programs and provides scheduling, input-output control, file and data management, memory management, and communication control and related services.

Additional data, including, for example, instructions for the processor 705 or other retrievable information, may be stored in storage 720, which may be a storage device such as a hard disk drive or solid state drive. The stored instructions in memory 710 or in storage 720 may include those enabling the processor to execute one or more aspects of the dispatch systems and methods of this disclosure.

The computer system 700 may further include a display controller 725 coupled to a display 730. In an exemplary embodiment, the computer system 700 may further include a network interface 760 for coupling to a network 765. The network 765 may be an IP-based network for communication between the computer system 700 and an external server, client and the like via a broadband connection. The network 765 transmits and receives data between the computer system 700 and external systems. In an exemplary embodiment, the network 765 may be a managed IP network administered by a service provider. The network 765 may be implemented in a wireless fashion, e.g., using wireless protocols and technologies, such as WiFi, WiMax, etc. The network 765 may also be a packet-switched network such as a local area network, wide area network, metropolitan area network, the Internet, or other similar type of network environment. The network 765 may be a fixed wireless network, a wireless local area network (LAN), a wireless wide area network (WAN) a personal area network (PAN), a virtual private network (VPN), intranet or other suitable network system and may include equipment for receiving and transmitting signals.

Systems and methods to access global data from accelerator devices according to this disclosure may be embodied, in whole or in part, in computer program products or in computer systems 700, such as that illustrated in FIG. 7.

Technical effects and benefits include the elimination of the overhead associated with TOC lookups by accelerator devices during run-time. In embodiments, the migrated global data can be accessed as efficiently as the original data in the host processor. Embodiments described herein generalize the TOC mechanism to accelerator devices with each device having its own TOC and contents that are updated at run-time.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/ or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system comprising:
   a memory having computer readable instructions; and
   one or more processors for executing the computer readable instructions, the computer readable instructions comprising:
   receiving, at an accelerator device, a table of contents (TOC) generated by a compiler, the TOC including an address of global data in a host memory space;
   copying the global data from the address in the host memory space to an address in the device memory space, the address in the host memory space obtained from the received TOC;
   updating the received TOC to indicate that the global data is stored at the address in the device memory space;
   executing a kernel that accesses the global data from the address in the device memory space, the address in the device memory space obtained from the updated TOC; and
   based on the executing of the kernel completing, copying the global data from the address in the device memory space to the address in the host memory space.

2. The system of claim 1, wherein the computer readable instructions further comprise restoring the TOC to the received TOC.

3. The system of claim 2, wherein the computer readable instructions further comprise deallocating a memory location associated with the address in the device memory space, the deallocating responsive to the restoring.

4. The system of claim 1, wherein the compiler generates one TOC per accelerator device.

5. The system of claim 1, wherein the receiving is performed during link-time.

6. The system of claim 1, wherein the copying the global data from the address in the host memory space to an address in the device memory space, updating, and copying the global data from the address in the device memory space to the address in the host memory space are performed during run-time.

7. The system of claim 1, wherein the accelerator device is an active memory cube (AMC).

8. The system of claim 1, wherein the receiving is during run-time, the compiler generates one TOC per kernel, the TOC further includes local data, and the method further comprises deleting the TOC based on the executing of the kernel completing.

9. A computer program product comprising a computer readable storage medium having program instructions embodied therewith, the program instructions executable by a processor to cause the processor to perform a method comprising:
   receiving, at an accelerator device, a table of contents (TOC) generated by a compiler, the TOC including an address of global data in a host memory space;
   copying the global data from the address in the host memory space to an address in the device memory space, the address in the host memory space obtained from the received TOC;
   updating the received TOC to indicate that the global data is stored at the address in the device memory space;
   executing a kernel that accesses the global data from the address in the device memory space, the address in the device memory space obtained based on contents of the updated TOC; and
   based on the executing of the kernel completing, copying the global data from the address in the device memory space to the address in the host memory space.

10. The computer program product of claim 9, wherein the method further comprises restoring the TOC to the received TOC.

11. The computer program product of claim 10, wherein the method further comprises deallocating a memory location associated with the address in the device memory space, the deallocating responsive to the restoring.

12. The computer program product of claim 9, wherein the receiving is performed during link-time, and the copying the global data from the address in the host memory space to an address in the device memory space, updating, and copying the global data from the address in the device memory space to the address in the host memory space are performed during run-time.

* * * * *